United States Patent
Stefan et al.

(10) Patent No.: US 12,343,784 B2
(45) Date of Patent: Jul. 1, 2025

(54) METHOD AND WIRE PROCESSING MACHINE THAT PRODUCES PREPARED SHAPED PARTS

(71) Applicant: WAFIOS Aktiengesellschaft, Reutlingen (DE)

(72) Inventors: Florian Stefan, Münsingen (DE); Oliver Kuhnert, Wannweil (DE); Jürgen Rauscher, Lichtenstein (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 349 days.

(21) Appl. No.: 17/794,022

(22) PCT Filed: Jan. 18, 2021

(86) PCT No.: PCT/EP2021/050925
§ 371 (c)(1),
(2) Date: Jul. 20, 2022

(87) PCT Pub. No.: WO2021/148343
PCT Pub. Date: Jul. 29, 2021

(65) Prior Publication Data
US 2023/0080602 A1   Mar. 16, 2023

(30) Foreign Application Priority Data
Jan. 23, 2020  (DE) .......................... 102020200797.7

(51) Int. Cl.
*B21F 13/00*          (2006.01)
(52) U.S. Cl.
CPC .................................. *B21F 13/00* (2013.01)
(58) Field of Classification Search
CPC .. B21F 1/02; B21F 11/00; B21F 13/00; B21F 23/00; B26D 3/14; B26D 3/16; B26D 3/161; B26F 2001/4427
(Continued)

(56) References Cited

U.S. PATENT DOCUMENTS 1,719,446 A  *  7/1929  Peirce ...................... B21K 1/64
                                                  83/613
2,106,274 A  *  1/1938  Frayer .................... B23D 21/00
                                                  83/519
(Continued)

FOREIGN PATENT DOCUMENTS

CN        105377466 A         3/2016
DE        1 602 632            5/1970
(Continued)

OTHER PUBLICATIONS

AT 520364 B1, Falkner et al. Nov. 2019.*
(Continued)

*Primary Examiner* — Edward T Tolan
(74) *Attorney, Agent, or Firm* — DLA Piper LLP (US)

(57) ABSTRACT

A method of producing shaped parts includes drawing wire from a wire stock and feeding the wire to a processing machine; straightening the wire in the wire processing machine; and separating shaped parts of a predefinable wire length from the straightened wire, wherein, to separate a shaped part from the fed wire, at a separating position provided for separation, the wire is first notched in at least one notching operation from two opposite sides by notching tools such that a tapered wire cross section remains between opposing notches at the separating position, and in a dividing operation, the notched wire is separated at the separating position in a region of the tapered wire cross section by engagement of two dividing tools on opposite sides of the wire and their synchronous feed in opposite feed directions perpendicularly to the wire axis until the wire material is severed at the separating position.

15 Claims, 9 Drawing Sheets

(58) Field of Classification Search
USPC .............................................................. 83/51
See application file for complete search history.

(56) References Cited

U.S. PATENT DOCUMENTS

| | | | | |
|---|---|---|---|---|
| 3,209,791 | A | * 10/1965 | Boots .................... | B21G 3/005 |
| | | | | 72/403 |
| 3,857,311 | A | 12/1974 | Esser | |
| 3,913,374 | A | * 10/1975 | Esser ....................... | B21L 3/00 |
| | | | | 225/96 |
| 3,938,364 | A | 2/1976 | Ragard et al. | |
| 4,836,006 | A | * 6/1989 | Brown ................... | B23D 23/04 |
| | | | | 72/402 |
| 5,117,671 | A | 6/1992 | Aikens et al. | |
| 5,195,350 | A | 3/1993 | Aikens et al. | |
| 5,207,084 | A | * 5/1993 | West ....................... | B21F 45/16 |
| | | | | 470/195 |
| 6,427,433 | B1 | 8/2002 | Kubota et al. | |
| 2020/0384521 | A1 | 12/2020 | Sautter | |
| 2021/0260644 | A1 | 8/2021 | Zana et al. | |

FOREIGN PATENT DOCUMENTS

| | | |
|---|---|---|
| DE | 1 602 632 A1 | 5/1970 |
| DE | 2 113 771 A1 | 10/1972 |
| DE | 2 141 513 A1 | 3/1973 |
| DE | 2 142 703 | 3/1973 |
| DE | 2 142 703 A1 | 3/1973 |
| DE | 2 203 913 A1 | 8/1973 |
| DE | 10 2017 205 633 A1 | 10/2017 |
| DE | 10 2017 200 745 A1 | 7/2018 |
| DE | 10 2018 114 579 B3 | 10/2019 |
| JP | S40-14674 B | 6/1964 |
| JP | S56-105857 A | 8/1981 |
| JP | H02-239580 A | 9/1990 |
| JP | H2-127335 U | 10/1990 |
| JP | H03155425 A | 7/1991 |
| JP | 2017-148837 A | 8/2017 |
| JP | 2018-099724 A | 6/2018 |
| WO | 2007/076751 A2 | 7/2007 |
| WO | 2013167232 A1 | 11/2013 |
| WO | 2019/243049 A1 | 12/2019 |
| WO | 2019/243342 A1 | 12/2019 |

OTHER PUBLICATIONS

DE 102018209889 B3, Wolf et al. Nov. 2019.*
JP 2017185512A, Osawa Oct. 2017.*
International Search Report dated Apr. 22, 2021 in counterpart International Application No. PCT/EP2021/050925.
Written Opinion dated Apr. 22, 2021 in counterpart International Application No. PCT/EP2021/050925.
Notice of Reasons for Rejection dated Sep. 3, 2024, of counterpart Japanese Patent Application No. 2022-544706, along with an English.
Office Action dated Jan. 25, 2025, from counterpart Chinese Application No. 202180010263.9.

* cited by examiner

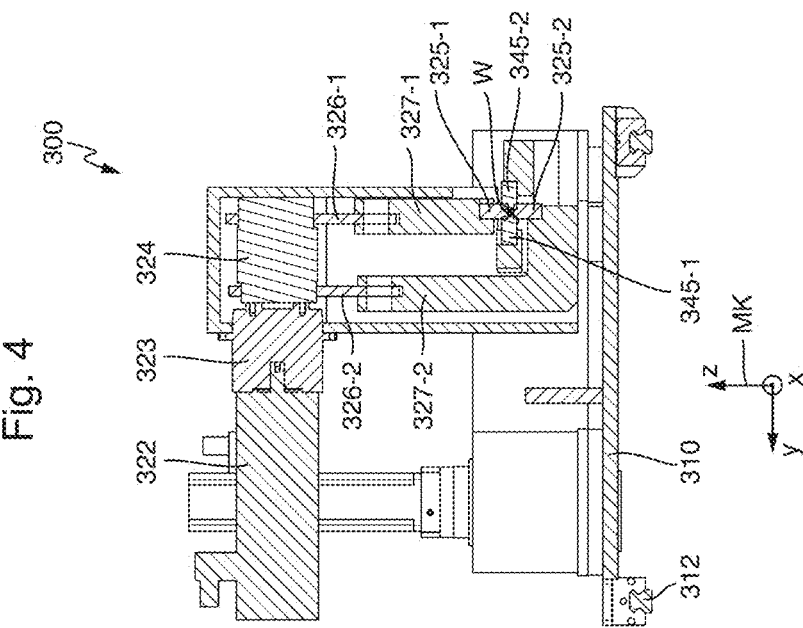
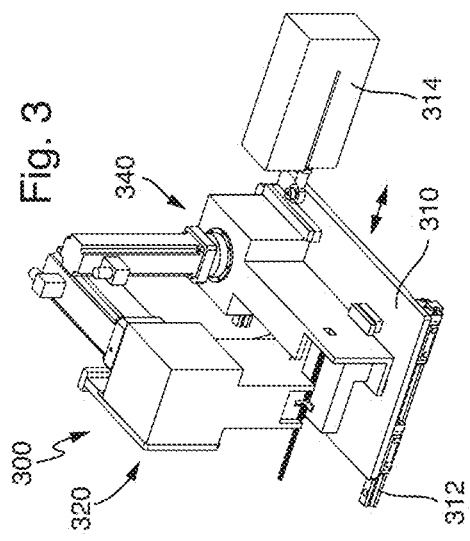
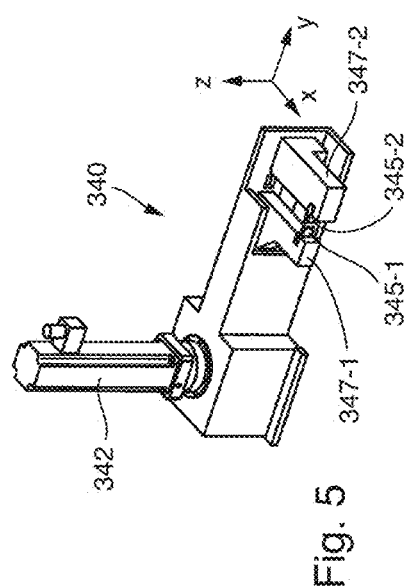

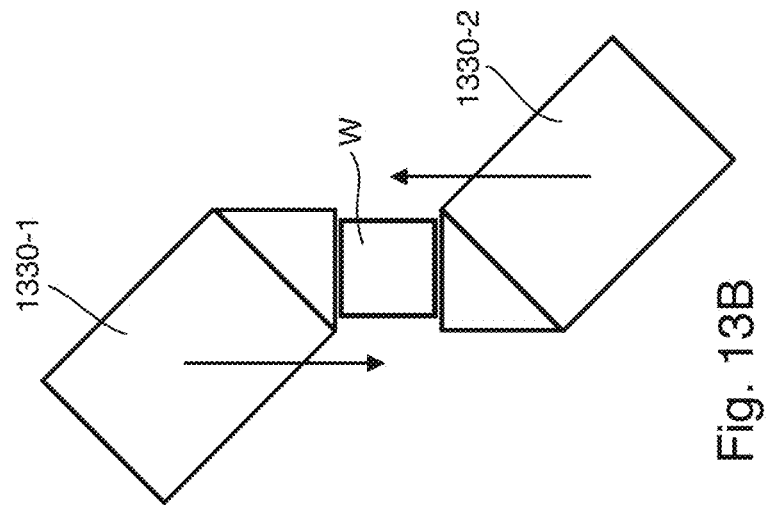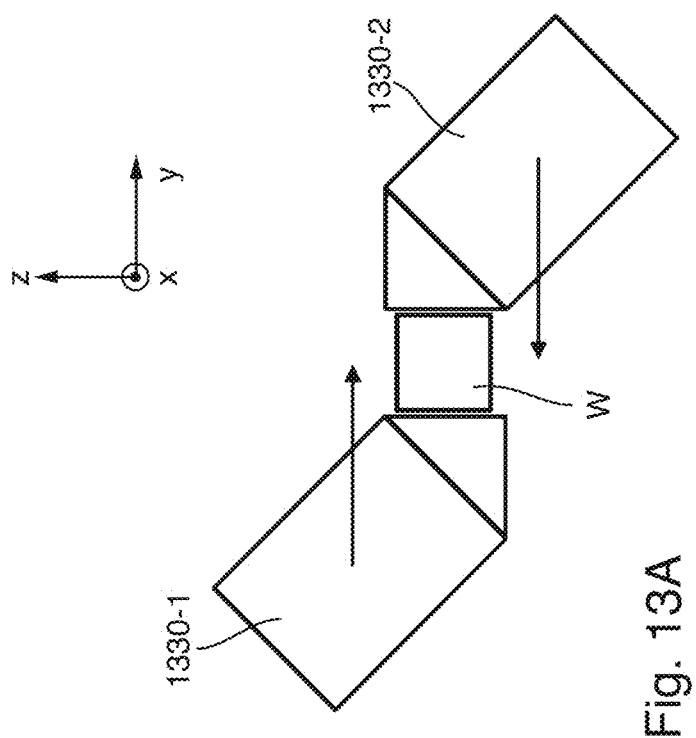

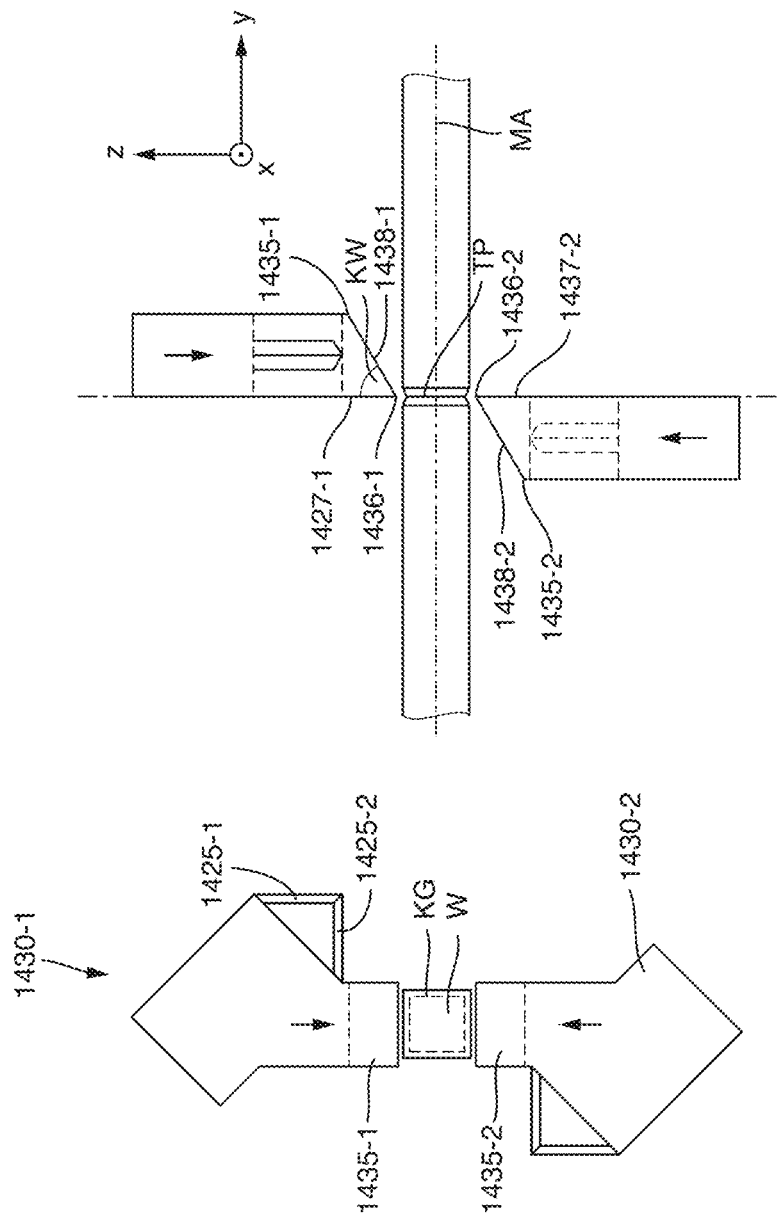

METHOD AND WIRE PROCESSING MACHINE THAT PRODUCES PREPARED SHAPED PARTS

TECHNICAL FIELD

This disclosure relates to a method and a wire processing machine that produces prepared shaped parts from wire.

The prepared shaped parts can be straight shaped parts, which are also referred to as "wire rods," or bent parts made of wire which are bent two-dimensionally or three-dimensionally and have one or more bends between the wire ends.

BACKGROUND

Vehicles with a fully or partially electric drive are increasingly available on the market. The vehicles usually have energy storage systems with a plurality of battery modules. The electrical energy must be transferred between the individual battery modules. For this purpose, insulated and bent copper or aluminum rails are used, which are also referred to as "busbars." Busbars are generally produced using appropriately shaped flat material, for example, copper or aluminum flat wire with a flat rectangular cross section. The flat material can be surrounded in sections or continuously by an electrically insulating insulation layer. On the finished busbar, these end sections are typically bare metal, i.e., without an insulating layer, and are, for example, screwed, clamped or soldered in place in the region of the end sections in the installation environment provided for them. To ensure reliable contacting, the end sections of the wires should match the corresponding contact element as well as possible. To make finish-machining of the wire ends superfluous as far as possible, the wire ends should be prepared in a wire processing machine immediately after production such that a good match with the installation environment is ensured.

DE 10 2018 114 579 B3 describes an area of application of prepared wire rods as well as a method and a device which can be used for their production to separate off wires without burrs. According to the description, in the production of electric motors for traction drives, individual winding elements (plug-in coils, so-called "hairpins") are produced, which are further processed in the subsequent process to form a complete stator winding. To achieve a higher efficiency of electric machines owing to a higher fill factor, a transition is said to have been made in hairpin technology from round wires to wires with a rectangular cross section. In the course of the production of plug-in coils, corresponding wire sections are cut to length and separated from continuous material and welded to one another after being positioned on the stator. To permit reliable and as burr-free as possible separation of wires using simple structural means, a method is proposed in which first of all (burr-free) forming of the wire takes place at a longitudinal position of the wire in a first forming step by moving two forming sections of a first forming unit which lie opposite one another in a first plane toward one another along a first movement axis. In this first forming step, the wire cross section is tapered from two opposite sides, for example, from two narrow sides. During forming of the wire, the forming sections of the first forming unit are always spaced apart from one another, thus leaving a tapered wire cross section. After this, forming of the wire takes place at the same longitudinal position of the wire in a second forming step by moving two forming sections of a second forming unit which lie opposite one another in a second plane toward one another along a second movement axis. During this second forming step, the already tapered wire cross section is tapered from two further opposite sides, for example, from two broad sides. During forming of the wire, the forming sections of the second forming unit are always spaced apart from one another, thus leaving the already tapered wire cross section with a more tapered shape. Thus, a material web remains at the longitudinal position of the wire, which is arranged offset inward relative to the original cross-sectional shape of the wire. At this point in time, the wire sections arranged before and after the longitudinal position of the wire (the intended separating point) are still connected to one another materially via the material web. After this, that is to say after the second forming step, tensile separation of the wire takes place at the same longitudinal position of the wire by applying a tensile force (which acts at least proportionately along the longitudinal direction of the wire) to the wire. The wire is thus separated off at the longitudinal position of the wire.

It could therefore be helpful to provide a method and a wire processing machine that produces prepared shaped parts from wire which make it possible to produce prepared shaped parts with a geometrically very well-defined shape of the wire ends.

SUMMARY

We provide a method of producing prepared shaped parts from wire including drawing wire in from a wire stock and feeding the wire to a wire processing machine, straightening the wire in the wire processing machine, and separating shaped parts of a predefinable wire length from the straightened wire wherein, to separate a shaped part from the fed wire, at a separating position provided for separation, the wire is first notched in at least one notching operation from two opposite sides by notching tools such that a tapered wire cross section remains between opposing notches at the separating position; and in a dividing operation, the notched wire is separated at the separating position in a region of the tapered wire cross section by engagement of two dividing tools on opposite sides of the wire and their synchronous feed in opposite feed directions perpendicularly to the wire axis until the wire material is severed at the separating position.

We also provide a wire processing machine that produces prepared shaped parts from wire, including a draw-in device that draws in wire from a wire stock; a straightening unit that straightens the wire; and a separating device that separates shaped parts from the wire at a separating position provided for separation, wherein the separating device includes a notching device and a dividing device that can be actuated later than the notching device, the notching device is configured to notch the wire at a separating position provided for separation in at least one notching operation from the opposite sides by notching tools such that a tapered wire cross section remains between opposing notches at the separating position; and the dividing device has, in the set-up state, two dividing tools, between which the wire can be passed, the dividing tools can be fed synchronously in opposite directions perpendicularly to the wire axis, the dividing device is configured such that the notched wire is separated at the separating position in the region of the tapered wire cross section, the dividing tools being fed synchronously in opposite directions perpendicularly to the wire axis during the dividing operation until the wire material is severed at the separating position.

BRIEF DESCRIPTION OF THE DRAWINGS

Further advantages will be found in the following description of preferred examples, which will be explained below with reference to the figures.

FIG. 3 shows an isometric view with components of the separating device in FIG. 1.

FIG. 4 shows a vertical section through the separating device of FIG. 1 in the plane (separating plane) in which the notching tools and the wedge-shaped cutters of the cutting device act.

FIG. 5 shows a partial view of components of the cutting device.

FIGS. 13A and 13B schematically show two tools, each with two wedge-shaped cutters oriented at an angle to one another, wherein the tools are used both as notching tools and as cutting tools.

FIGS. 14A, 14B, 14C and 14D schematically show a method variant with the step sequence: notching-notching-shearing, wherein a respective combination tool with three differently designed functional sections for the functions of (i) notching in a first direction, (ii) notching in a second direction perpendicular to the first direction and (iii) shear cutting is used for all partial steps on opposite sides of the wire.

DETAILED DESCRIPTION

Figure 1:
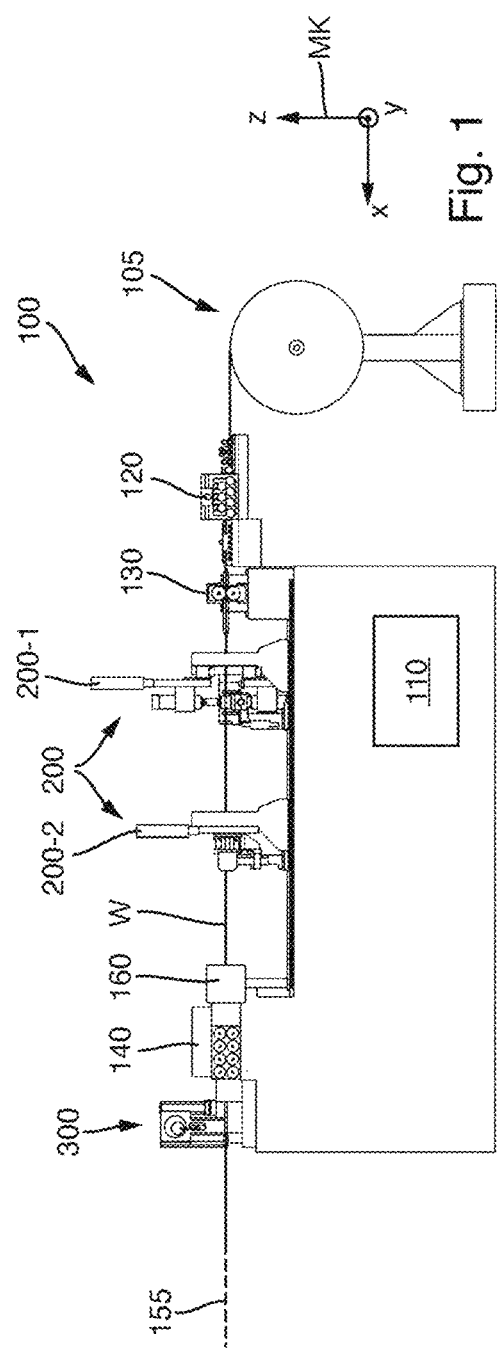
FIG. 1 shows a side view of a wire processing machine according to one example, which is designed as a rod preparation machine.

The method and the wire processing machine are used to produce prepared shaped parts from wire. The term "prepared shaped parts" refers to semi-finished products or finished products produced from wire which have a wire length desired for the purpose of use and wire ends which are as well-defined as possible. In particular, the wire ends should have a geometry suitable for the intended use, for example, with a bevel at the wire end. The starting material wire is a long, more or less easily bent metal part with a suitable cross-sectional shape. Wires with a circular cross section are referred to as round wires. There are also wires with other cross-sectional shapes, for example, flat wires, square wires or profiled wires.

The prepared shaped parts can be straight shaped parts, which are also referred to as "wire rods," or bent parts made of wire which are bent two-dimensionally or three-dimensionally and have one or more bends between the wire ends. A wire processing machine that produces straight prepared wire rods is occasionally referred to as a "rod preparation machine," and wire processing machines that produces bent prepared shaped parts are generally referred to as bending machines. The prepared shaped parts may also be springs (e.g., helical springs), which can be produced from wire by spring machines.

In the method, wire is drawn in bit by bit continuously or intermittently from a wire stock and fed to a wire processing machine. The wire is straightened in the wire processing machine. Shaped parts (wire sections with a predefinable wire length) and the desired shape (form) are then separated from the wire.

Between the straightening and the separation, one or more bending operations can be carried out to produce a shaped part with one or more bends, that is to say a bent part. Alternatively, straight wire sections, so-called wire rods, can be separated from the straightened wire.

To separate a wire rod of the desired length from the fed wire, a plurality of functionally different operations are carried out one after the other in time.

First, the wire material is notched at a separating position or separating point provided for separation in (at least) one notching operation from two opposite sides by notching tools such that a section with a tapered wire cross section remains between opposing notches at the separating position.

The term "notch" refers in general to an indentation made in the wire material by material displacement and/or material removal. The size and shape of the notches is determined by the effective contour of the notching tools which comes into engagement with the wire material and its penetration depth.

The notching operation is preferably a forming operation in which the notches are produced exclusively by material displacement or material forming without material removal. The notches are thus preferably produced by traditional forming of the wire material in the region of the separating position.

The notching tools can, for example, have a more or less pointed wedge shape. The notches produced thereby then usually form a substantially V-shaped, that is to say wedge-shaped or pointed, indentation in the wire material. However, the shape of the notch is not restricted to a V shape. A notch can also be rounded off to a greater or lesser extent in the region of the notch bottom. It is also possible to produce notches in the form of substantially cylindrical indentations or notches with a U shape.

The notching tools are preferably fed synchronously in opposite feed directions, perpendicularly to the wire axis, during the notching operation. For this purpose, the notching device can be appropriately configured for synchronous feed of the notching tools. It is thereby possible to ensure that, in the ideal use, there are no resultant transverse forces acting on the wire during notching and the wire is not bent as a whole by the notching.

The feed movement of the notching tools is preferably controlled such that a penetration depth of the notching tools is at least 10%, preferably in the range of 20% to 50%, of the extent of the unnotched wire material in the first direction. It is thus possible to ensure that corresponding residual widths (perpendicular to the longitudinal direction of the wire) remain in the tapered wire section or in the necked region of the thinner web, these residual widths being in the range of 90% or less, in particular in the range of 50% to 80%, of the original diameter in the first direction. Thus, in our experience, a particularly good compromise can be achieved between good preparation for the subsequent cutting operation and, at the same time, sufficient stability in the region of the tapered wire cross section.

Alternatively, a notch can be produced while removing material, for example, by milling or punching.

The important point is that a wire section with a tapered wire cross section should remain within the wire in the region of the separating position in the notching operation. Thus, the wire material is not completely severed at the separating position. Instead, sections in front of and behind the notches remain integrally connected to one another via a tapered wire material web. During a notching operation by forming, the wire material is generally hardened in the region of the tapered wire cross section, that is to say there is an increase in the mechanical strength of the wire material on account of plastic deformation.

After completion of the notching operation, a dividing operation is carried out. By the dividing operation, the notched wire is separated at the separating position, in the region of the tapered wire cross section, by the engagement of two dividing tools on opposite sides of the wire and their synchronous feed in opposite feed directions perpendicularly to the wire axis until the wire material is severed at the separating position.

The term "perpendicular" includes directions which are either exactly perpendicular (at an angle of 90°) to the wire axis or deviate by one degree or a few degrees, for example, at most 5° from the exactly orthogonal direction. The important point is to aim for a vertical feed within the scope of the technological tolerances. Correspondingly, the term "synchronous" indicates simultaneity within the scope of reasonable technological tolerances inherent in the control system and hardware.

The term "dividing" refers to the complete separation of the wire into two parts at the separating position in accordance with DIN standard DIN 8588. Separation is performed mechanically without chip formation. A dividing operation is thus a separating operation in which the wire is not machined but is separated without chip formation (without material removal or without the production of chips). Dividing tools are thus cutting tools that work without chip formation.

In a wire processing machine for the production of prepared shaped parts (e.g., wire rods or bent parts) from wire material, a separating device is provided at a separating position provided for separation, for the purpose of separating shaped parts from the straightened wire material or wire material which is still one-dimensionally or multi-dimensionally bent after straightening, the separating device having a notching device and a dividing device which can be actuated later than the notching device. The separating device is designed to carry out the method.

The method can be carried out such that, after straightening, straight wire rods of predefined length are separated from the straightened wire without an intermediate bending operation. Alternatively, it is possible for one or more bends to be produced in the straightened wire after straightening and before separation, the shaped part thus being a bent part.

A wire processing machine suitable and set up for carrying out the method has a dividing device which, in the state set up ready for operation, has two dividing tools, between which the wire can be passed, wherein the dividing tools can be fed synchronously in opposite directions perpendicularly to the wire axis to carry out a dividing operation, and wherein the dividing device is configured such that the notched wire can be separated at the separating position in the region of the tapered wire cross section, the dividing tools being fed synchronously in opposite directions perpendicularly to the wire axis during the dividing operation until the wire material is severed at the separating position.

As a rule, there is no contact between the dividing tools and the wire before the feeding in of the dividing tools begins, and therefore the dividing tools do not hold the wire. In the course of the infeed, the dividing tools then come into contact with the wire and act mechanically on the wire material. Theoretically, the dividing tools will contact the wire simultaneously with the same force. In practice, this cannot always be ensured due to technological tolerances. To prevent tilting of the wire out of the ideal wire orientation in the event of non-simultaneous engagement of the oppositely acting dividing tools, adjustable hold-down devices can be provided in front of and behind the separating position, which hold the wire temporarily in the desired orientation before and possibly also at the start of the dividing operation.

By virtue of the synchronous bilateral engagement of the dividing tools on opposite sides of the wire material, it is possible to avoid bending of the end section as a whole, thus ensuring that it retains the straight shape which is present without transverse forces, even during and after the dividing operation. Prepared wire rods produced according to the method can generally be used for the intended use without finish-machining. Further processing is thus possible in a more economical way than hitherto.

There are different possibilities for configuring and coordinating the notching operation and the dividing operation.

For example, a dividing operation in the form of a cutting operation is carried out after completion of the notching operation. The wire is thus separated by the process of cutting as a special type of chipless division. The dividing device is accordingly configured as a cutting device, and the dividing tools are designed as cutting tools. A cutting tool has at least one cutter, on which a cutting edge is formed, which is preferably a straight cutting edge.

Division is preferably accomplished by bite cutting or shear cutting, and this will be explained in detail below.

In an example of the cutting operation, the notched wire material is separated by bite cutting in the region of the tapered wire cross section, that is to say at the separating position. This is done such that the wire material is held in a suitable position in the region between two wedge-shaped cutters of cutting tools, and that the cutting tools or the wedge-shaped cutters are moved relative to one another, toward one another, until the wire material is severed at the separating position. As a rule, there is no contact between the cutters and the wire before the feeding in of the cutters begins, and therefore the cutters do not hold the wire. In the course of the infeed, the cutters then come into contact with the wire and penetrate into the wire material.

The production process of "bite cutting" is a variant of wedge-action cutting and, according to DIN 8588, belongs to those separating methods which divide the workpiece to be separated without the production of chips. The cutting edges formed on the wedge-shaped cutters lie in a common plane. The relative movement can be guided such that the cutting edges are in contact with one another at the end of the cutting operation. If the flat material has already been severed before the contact between the cutting edges occurs, the feed movement can also be terminated beforehand. During bite cutting, the wedge-shaped cutters penetrate from two opposite sides into the wire material to be divided. We found that formation of sharp burrs at or on the ends of the wire material can be avoided by this type of cut. It can be stated that the cutting operation allows substantially burr-free cutting of wire material.

By virtue of the synchronous bilateral engagement of the wedge-shaped cutters of the cutting tools on opposite sides of the wire material, it is possible to avoid bending of the end section as a whole, thus ensuring that it retains the straight shape which is present without transverse forces, even during and after the cutting operation. Wire rods prepared in this way can generally be used for the intended use without finish-machining.

This two-stage process example of "notching and bite cutting" leads to separation of the wire sections lying in front of and behind the separating position exactly at the intended separating position, without tensile forces acting in the longitudinal direction of the wire having to be introduced externally. In contrast to conventional tensile separation, it is therefore possible to dispense with corresponding devices for tensile separation. Since it is necessary to introduce tensile forces acting in the longitudinal direction of the wire for the purpose of tensile separation, it cannot be ruled out that the length of the separated wire rods will change slightly as a result, and therefore length errors caused by tensile forces may occur. This source of errors is excluded in our method, and therefore prepared shaped parts, e.g., wire rods, with precisely defined lengths between the wire ends are produced systematically.

In addition, the geometric shape of the wire ends, which are formed at the separating position, can be precisely defined by the effective geometry of the notching tools used in the notching operation and/or of the wedge-shaped cutters used in the cutting operation. This applies especially if the notching operation is a pure forming operation since the notching tools and the wedge-shaped cutters do not act by tension and/or by material removal but only by plastic material displacement, and therefore their active contours are at least partially impressed into the wire material or into the wire ends. Thus, it is possible to produce systematically prepared wire pieces (straight or bent) with narrow length tolerances and with geometrically very well defined wire ends.

The two-stage process can also be described such that the cutting operation in which the wire material is severed by "bite cutting" at the separating position is preceded by a notching operation, in which the wire material is prepared for bite cutting in the region of the intended separating position by the notching operation. Particularly in a preparatory notching operation involving forming to produce the tapered wire cross section, the wire material is hardened in the region which is to be subsequently severed with the wedge-shaped cutters. The wedge-shaped cutters thus do not impinge upon the wire material which has not been pre-treated but on wire material which has already been pre-treated and which has been hardened by the notching operation and can thus be separated reliably and more cleanly than the undeformed wire material, which is relatively soft compared to the tapered wire cross section. This effect too contributes to a clean geometric definition of the wire ends.

For example, the notching tools are arranged or can be arranged opposite one another in a first direction and can be fed in parallel to the first direction, while the wedge-shaped cutters of the cutting tools are arranged or can be arranged opposite one another in a second direction and can be fed in parallel to the second direction, wherein the first and the second direction run perpendicular to one another. The notching operation and the cutting operation thus act on the wire material in mutually orthogonal directions. It is thereby possible to produce a taper of the wire material at the wire ends in both directions perpendicular to one another. The cut surface or fracture surface ultimately produced in the bite cutting process lies within the enveloping surface of the starting wire from all directions, with the result that no burrs remain which project beyond the outer periphery of this enveloping surface. The orthogonal directions of action of the notching operation and the cutting operation can advantageously be used with all workpiece cross sections, that is to say also in round wires. If a starting workpiece having a rectangular cross section is separated, the wire material should be oriented in a way with respect to the first and second directions that the first direction is oriented perpendicularly to a first pair of flat side faces, while the second direction is oriented perpendicularly to the other pair of mutually parallel side faces. As a result, the notching tools and subsequently the cutting tools can each engage in the wire material substantially simultaneously over the entire width of the contact surface, thereby ensuring that geometrically particularly well-defined wire ends are produced.

Usually, the narrow side is notched first, before the cutting tools then engage on the broad sides. As a result, the geometry of the notches is largely retained during cutting. However, a reverse sequence (notching on the broad sides, cutting over the narrow sides) is also possible.

It is possible for the notching tools to lie in a first plane oriented perpendicularly to the wire passage direction and for the wedge-shaped cutters of the cutting tools of the cutting device to lie in a second plane which is perpendicular to the wire passage direction and is offset relative to the first plane in the wire passage direction. This arrangement can result in degrees of design freedom for the configuration of the cutting device and the notching device. However, the material transport between the two planes must take place with high accuracy to ensure that the cutting operation intervenes sufficiently accurately at the position at which the notches were previously introduced.

Preferably, the wire material is not moved in the longitudinal direction of the wire between the notching operation and the cutting operation, with the result that the notching operation and the cutting operation are carried out in the same plane. In terms of design, this can be achieved by arranging the notching tools of the notching device, more precisely their effective ends facing the tool, and the cutting edges on the cutters of the cutting tools or of the cutting device in a common plane. In this example, irrespective of the state of movement of the wire, the notching and the cutting can take place precisely at the intended separating position, thus ensuring that there is no axial offset between the notches and the separating point on the wire. The shapes of the wire ends can be predetermined exactly by the tool shapes of the notching tools and of the cutters.

There are different possibilities for the configuration of the notching tools. Preferably, the notching tools are designed as roof-shaped notching wedges with a sharp or rounded tip region, that is to say they are likewise substantially wedge-shaped. It may be advantageous if the wedge-shaped notching tools are configured as symmetrical wedges. In this context, the term "symmetrical wedge" refers to a wedge on which the wedge surfaces or wedge cheeks are inclined substantially symmetrically to the feed direction. This makes it possible to achieve symmetrical material displacement on both sides during notching. Asymmetrical wedge shapes are also possible, for example, if the wire ends of a shaped part are to be configured differently.

The wedge angle, that is to say the angle enclosed by substantially flat wedge surfaces, can be selected according to the application. In many configurations, the wedge angle enclosed by the wedge surfaces is in the range of 900 to 140°, i.e., it is an obtuse angle. With this geometry, bevels can be produced in a precise way at the wire ends, for example.

As an alternative or in addition, provision can be made for the wedge-shaped cutters of the cutting tools to have a wedge angle in the range of 900 to 140°. In particular, it can be that the wedge angles on notching wedges substantially coincide with the wedge angles on the wedge-shaped cutters. This makes it possible, for example, to produce uniformly inclined bevels on all four side faces on wire material having a rectangular cross section. The wedge-shaped cutters can be configured symmetrically with respect to the feed direction, optionally also asymmetrically.

The notching tools and/or the wedge-shaped cutters can each have a dedicated drive, which brings about the feed movement. Preferably, however, the notching device has only a single drive, which is coupled to both notching tools for synchronous feed. On the one hand, this is a low-cost solution since one drive can be eliminated. On the other hand, the precision of the oppositely directed feed of the notching tools during the notching operation can thereby be structurally ensured.

Similarly, provision can be made for the cutting device to have only a single drive, which is coupled to both wedge-shaped cutters for synchronous feed.

In some examples, the drive of the notching device drives a crankshaft which, via two connecting rods, drives two slides which can be moved linearly in opposite directions and which each carry the notching tools at their ends facing the workpiece. An analogous solution can be provided in the cutting device.

An alternative solution envisages that only a single drive is provided to control the movements of the notching tools of the notching device and of the wedge-shaped cutters of the cutting device. This drive can drive a cam disk with a control cam which is designed such that, with correctly synchronized rotation of the cam disk about its axis of rotation in the correct direction of rotation and to the correct extent, it is alternately possible first of all for the notching tools to be fed in and retracted, and then for the cutting tools with the wedge-shaped cutters to be fed in the direction of the workpiece and then retracted. To adapt this variant to different wire geometries, the cam disks can be exchangeable, enabling them to be replaced with cam disks that have different control cams.

The separating device or its components can be mounted on the machine frame of the wire processing machine to be fixed with respect to the machine. In some examples, on the other hand, provision is made for the separating device to be mounted in a floating manner parallel to the direction of passage of the wire or to the passage axis. This enables the separating device to compensate for resultant forces in the longitudinal direction of the wire which occur during notching and/or during division by a floating movement parallel to the direction of passage of the wire. We found that this makes it possible, inter alia, for the wire geometry at the wire ends to correspond particularly exactly to the specifications and for the wire pieces in the vicinity of the wire ends not to be bent, but to be straight. It is also possible for the separating device to be actively movable parallel to the direction of passage of the wire with the aid of a drive (e.g., a servomotor).

In wire processing machines intended to produce prepared shaped parts in the form of bent parts, a corresponding bending device with one or more bending tools is provided. The bending device is arranged and designed such that separation between the finished bent shaped part and the fed wire section which has not yet been bent takes place after completion of all the bending operations envisaged. There are several design possibilities for this. The bending device can be arranged downstream of the separating device in the direction of passage of the material, thus ensuring that there is an axial distance between the two. It is also possible for the bending device or its tools to lie in the same plane as the separating device. The tools of the bending device can thus act in the separating plane. The finished shaped parts can be sorted into good parts and problematic parts with the aid of a sorting device, for example, and can subsequently be transported away. The same is also possible with wire processing machines designed as rod preparation machines that produce straight wire rods with defined wire ends.

In contrast, some examples are distinguished by the fact that a transport gripper is provided to grip a wire section to be separated before the notching operation and/or the cutting operation, to transport the separated wire section, after the cutting operation has been completed, to a downstream workstation. The transport gripper can be guided in a linearly movable manner parallel to a wire transport axis and is switched to a reduced force and torque during the notching operation and/or during the cutting operation, thus enabling the transport gripper to follow in a floating manner length-compensating movements of the wire section to be separated during the notching operation and/or during the cutting operation. Thus, it is ensured, even in the devices for onward transport of cut-to-length prepared shaped parts, that, once the shaped part has been gripped, no constraining forces react upon the separating process.

To furthermore ensure that the separating operation cannot be negatively influenced by tensile forces acting parallel to the longitudinal axis of the wire, the transport device is preferably configured such that the transport movement cannot begin until the cutting operation has been completed, that is to say only when the shaped part to be separated has actually been separated from the fed wire. On the other hand, gripping of the shaped part to be separated can take place even before the wire is completely severed.

Other examples combine the method steps of notching and subsequent shearing. The following problems, among others, can thus be addressed.

For the fitting of hairpins (plug-in coils) into a stator lamination stack with groove insulation paper in a reliable process, beveled ends, which are as burr-free as possible, on the hairpin legs are preferred. A more or less pointed pyramid shape can be formed during bite cutting or during tensile cutting, depending on the wedge angle of the notching and cutting tools. After the hairpins have been inserted and interlocked in the stator lamination stack, the hairpin ends are generally contacted by a welding process. The pointed ends of the hairpin legs are therefore frequently re-cut before the welding process, giving rise to perpendicular surfaces which can be better welded to one another.

According to an example, re-cutting can be dispensed with without loss of quality.

In this example, the dividing operation is designed as a shearing operation, wherein the wire is separated at the separating position by shear, the wire being held between two dividing tools, which are designed as shearing tools, engage on different axial sides of the separating position and are moved synchronously in opposite feed directions perpendicularly to the wire axis, until the wire material is severed at the separating position.

The dividing device is accordingly designed as a shearing device configured for the shearing operation in the state set up ready for operation.

In mechanics, shearing results, as is known, from the action of an offset pair of forces. The forces are introduced via the shearing tools, one of which acts in front of the separating position in the longitudinal direction of the wire and the other acts behind the separating position in the longitudinal direction of the wire, on the opposite side with respect to the wire axis. The forces thus act on the wire at axially offset positions. The separating position is located in between. A relatively smooth shearing surface, which is oriented perpendicularly to the longitudinal axis of the wire, is produced there at the free end of the wire when the process is carried out correctly.

The shearing tools can have a non-cutting, two-dimensionally extended working surface and, near the separating position, can be supported over an extended area and in a manner that is gentle on the material on axially and radially opposite side faces of the wire and, when the shearing tools are fed in opposite directions, can introduce the forces which lead to separation by shearing at the separating position.

The use of shearing tools with a cutting edge is preferred. In other words, the cutting operation can also be configured as a shear cutting operation.

Particularly with a view to this application, outlined above, in the production of hairpins, a development with a shear cutting operation is proposed which makes it possible to simplify the overall process and can make subsequent processes such as the finishing of the leg ends, unnecessary.

In this example, the division following notching is carried out by shear cutting. According to DIN 8588, shear cutting or shearing is the division of a material by two cutters moving past one another. According to a modified definition, the material is divided during shearing by two cutters, which can move past one another, but do not have to in all instances. In contrast to bite cutting, the cutters do not lie in a common plane but in planes which are slightly offset axially with respect to one another. In relatively soft materials such as, for example, copper, the cutters must, as a rule, move past one another to achieve separation. In harder, more brittle materials such as spring steel, for example, the material may tear and thus separation is complete before the cutters reach one another. The feed can then be stopped.

For shear cutting, the shearing tools are equipped, like scissors, with cutting edges which move in opposite directions in planes offset from one another during the shearing process and, if appropriate, move past one another. In this example, the material is sheared off by shear forces. In this example, the cutters move parallel to an intermediate cutting plane, and there is a narrow shear gap between the cutters. The cutting plane is positioned at the separating position. By shear cutting, it is possible to ensure that the end face of the separated wire lies substantially in a plane perpendicular to the longitudinal axis of the wire at the separating position. The end section of the wire can have the shape of a truncated pyramid. A flat, macroscopically level end face can be advantageous, inter alia, in examples in which the wire is to be butt-joined to the surface of another component in subsequent processing steps, e.g., by welding.

This provides, inter alia, a separating method in which a beveled wire end is produced for easy fitting into a stator lamination stack and, in addition, a straight surface remains at the wire end, which is required for a reliable welding process. It is thus possible to dispense with the subsequent process of "finish-cutting of hairpin ends," thus reducing the production costs in stator manufacture.

In preparation for the shearing operation, in particular for the shear cutting operation, it has proven to be advantageous if the wire is notched beforehand on four sides which lie opposite one another in pairs. In wires having a rectangular cross section, the notches preferably lie on all substantially flat side faces. To achieve this, the notching device of corresponding examples is configured such that, in the notching operation which precedes the shearing operation, the wire is first of all notched on two sides which are situated opposite one another in a first direction and then on two sides which are situated opposite one another in a second direction, wherein the first and the second direction run perpendicular to one another.

Different tools specifically designed for the respective operations can be used for the notching operation and the dividing operation. However, this is not absolutely necessary. In some examples, a respective combination tool is used for the notching operation and the dividing operation on opposite sides of the wire, the combination tool having (at least) one integrated notching tool and one integrated separating tool, wherein the combination tools are fed synchronously in pairs, one after the other in time, in two mutually perpendicular directions. In this example, the notching function and the dividing function (e.g., by bite cutting or by shear cutting) are integrated into a single tool. The tool-carrying components of the wire processing machine must then have the required degrees of freedom of movement which allow feed movements in orthogonal feed directions.

A combination tool can be designed, for example, for the sequence: notching-bite cutting. Another combination tool can be designed for the sequence: notching-notching-shear cutting.

Moreover, in the examples in which division is produced by shearing, in particular by shear cutting, it is possible to select many accompanying features and measures by analogy with the examples involving division by bite cutting. These include, in particular, the use of a single drive for different working movements of a tool and/or the use of a transport gripper and/or the preferred dimensions of notch depths, notch angles and/or the resting of the wire during the steps of the cutting operation.

FIG. 1 shows a side view of a wire processing machine 100 according to one example, which is designed overall as a rod preparation machine. The wire processing machine is designed to produce prepared shaped parts in the form of straight wire rods. The wire processing machine has a rectangular machine coordinate system MK designated by small letters x, y and z, with a vertical z axis and horizontal x and y axes. In the example shown, the x axis runs parallel to a direction of passage in which wire material passes through. A distinction must be made between the coordinate axes of the machine coordinate system and the machine axes driven under feedback control, which are usually designated by capital letters (e.g., A axis). A control unit 110 of the wire processing machine controls and coordinates the working movements of all the machine axes.

The wire-shaped starting material W is in the form of wound material stock (coil) which, in the example, is wound on a reel 105. The starting material is in the form of electrically insulated flat material which comprises an electrically conductive carrier material surrounded by an electrically insulating insulation layer. The term "flat material" generally refers to workpieces whose electrically conductive carrier material has side faces aligned in pairs parallel to one another. The carrier material can, for example, have a rectangular cross section with relatively sharp or slightly or completely rounded edges and/or beveled edges. Flat materials in the form of insulated copper or aluminum wires with a rectangular cross section can be used, for example, to produce coil elements for electric motors or producing busbars.

After leaving the reel 105, the flat material enters a downstream subassembly more or less coaxially with the passage axis 155. This comprises, in this sequence along the passage axis 155 of the workpiece, a straightening device 120, a length measuring device 130, a stripping device 200, a brushing device 160 arranged downstream of the stripping device, a draw-in device 140 arranged downstream of the brushing device, and a separating device 300 arranged downstream of the draw-in device.

The straightening device 120 has two straightening apparatuses arranged in series, with straightening rollers which successively work the workpiece passing through in two mutually perpendicular directions and thereby straighten it.

The optional length measuring device 130 has a measuring wheel and an opposite running wheel and allows exact measurement of the workpiece length conveyed to the following units.

The integrated stripping device 200 serves to strip sections of the insulated flat material before separating the shaped part from the fed flat material. The milling device 200 comprises two subunits arranged axially offset from one another, namely a first subunit 200-1 arranged directly downstream of the length measuring device 130, and a second subunit 200-2 arranged at an axial distance downstream of the first subunit. Each of the subunits is designed to simultaneously strip two mutually opposite side faces of the flat material by peripheral milling in a milling operation. Each of the subunits has two milling units whose milling spindles are arranged axially parallel and axially offset with respect to one another such that the axes of rotation of the milling spindles are offset parallel with respect to one another and the milling tools accommodated in the milling spindles can be rotated about axes of rotation offset parallel with respect to one another. In the first subunit 200-1, the axes of rotation of the two milling units are aligned vertically, that is to say parallel to the z direction of the machine coordinate system, thus enabling the side faces of the flat material which are situated opposite one another in a horizontal plane to be stripped at the same time. In the following second subunit 200-2, the axes of rotation of the milling units are aligned horizontally, that is to say parallel to the y axis of the machine coordinate system, in order simultaneously to strip the upper and lower sides, situated vertically one above the other, of the flat material passing through. The milling units of the subunits arranged at a distance one behind the other are thus mounted offset by 90° with respect to one another.

In other examples, the stripping device operates according to another principle, for example, with the aid of laser machining or by a peeling operation by blades having a straight cutting edge, which, in an operating position of the blade, is arranged in the vicinity of a side surface, which is to be exposed, of the carrier material such that a part of the insulation layer with which the blade makes contact is removed from the carrier material as the flat material is moved along relative to the blade (cf. DE 10 2017 200 745 A1).

A stripping device can also be dispensed with, e.g., if the starting material to be processed is bare, that is to say is not surrounded by an insulation layer. The same applies, if appropriate, to the brushing device 160.

The feed movement is produced with the aid of the draw-in device 140 arranged behind the stripping device 120, which pulls the workpiece through the upstream devices with a draw-in profile which can be specified by the controller and conveys it to the downstream separating device 300. In this example, the feed force in the draw-in direction (x direction) is produced by friction between draw-in rollers or draw-in belts of the draw-in device and the flat material. As an alternative, it is possible, for example, to provide for draw-in by tongs.

The separating device 300 is arranged directly downstream of the draw-in device 140, and no bending deformation of the flat material takes place within the stripping device 120, with the result that the separating device separates straight shaped parts of predefinable length, that is to say wire rods, from the fed stripped flat material. The separating device and variants thereof are described in detail below.

Figure 2:
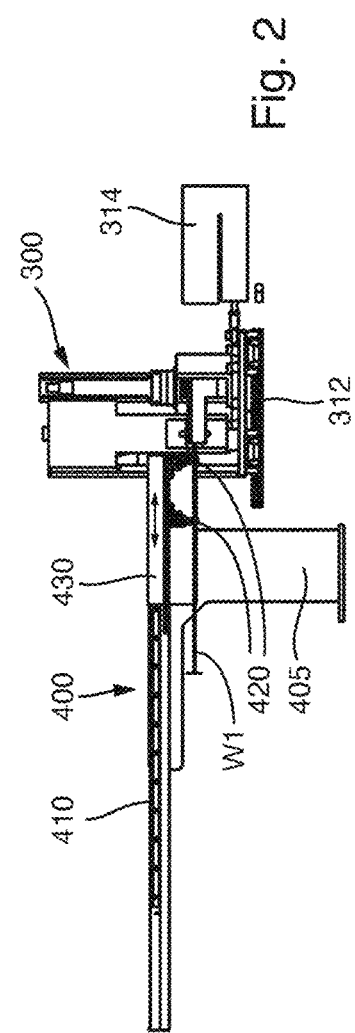
FIG. 2 shows a transport device arranged downstream of the separating device for the individual onward transport or transfer of the separated wire rods to a downstream further processing machine.

After separation from the fed wire material, the wire rods can, for example, be collected in a collecting device (not illustrated) and fed to further processing. In the example, a transport device 400, which is illustrated schematically in FIG. 2, is arranged downstream of the separating device 300. This is used for the individual onward transport or transfer of the separated wire rods to a downstream further processing machine and is also referred to here as a "rod transfer device" or, in abbreviated form, as "rod transfer." The transport device 400 has a horizontal linear guide 410, which is supported by a bracket 405 and on which a transport gripper 420 is guided in a linearly movable manner. The gripping members of the transport gripper are mounted on a carriage 430, which is equipped with a servomotor and can run along the linear guide 410.

In FIG. 2, the hanging transport gripper grips a wire rod W1 to be separated from above before the start of the separating operation, holds it in horizontal alignment during the separating operation, and, after the separating operation has been completed, transports the separated wire rod to the left for onward transfer, before it travels horizontally back behind the separating device to grip a new wire rod.

In the configuration shown, the transport gripper 420 is switched to a reduced force and torque during the separating operation, thus enabling the transport gripper 420 to follow any length-compensating movements of the wire section to be separated in a horizontally floating manner during the separating operation.

The construction and functioning of the separating device 300 will be explained in more detail below with reference to FIGS. 3 to 5. FIG. 3 shows an isometric view with components of the separating device 300, FIG. 4 shows a vertical section through the separating device 300 in the plane (separating plane) in which the notching tools and the wedge-shaped cutters of a cutting device act, and FIG. 5 shows a partial view of components of the cutting device.

The separating device 300 serves to separate shaped parts of a predefined wire length from the fed wire material at a separating position that can be predefined for separation. The term "separating position" describes a defined position along the wire, i.e., a certain point along the wire. The separating device 300 comprises a notching device 320, some components of which are shown in FIG. 4, and a dividing device, which can be actuated in a coordinated manner with the notching device and is in the form of a cutting device 340, the components of which are shown again in isolation in FIG. 5.

These components of the separating device 300 are mounted in their entirety in a floating manner in the horizontal direction parallel to the passage axis 155 of the wire. For this purpose, the components are mounted on a base plate 310, which is guided in a linearly movable manner on linear guides 312 in the form of recirculating roller guides. On the side facing the straightening unit 140, a servomotor 314 is mounted, which can axially move a tie rod articulated on the base plate. This enables the separating device 300 as a whole to be returned by a motor after a forward floating movement has taken place. The servomotor can also be used to actively move the separating device during the separating operation if the floating mounting is not sufficient to enable the resulting forces in the longitudinal direction to be compensated. The servomotor can thus also be used for the axial positioning of the entire separating device 300 in the x direction (parallel to the passage axis 155).

The notching device 320, the components of which can be seen in a vertical section in FIG. 4, is designed such that wire material can be notched from two opposite sides at the desired separating position by forming, that is to say without material removal, by a notching operation with the aid of notching tools 325-1, 325-2. The notching operation is controlled such that a tapered wire cross section remains between the opposing notches at the separating position. For this purpose, the notching tools can be fed in anti-parallel in a coordinated manner along a vertical first direction (parallel to the z axis), symmetrically with respect to the passage axis 155. For this purpose, the notching device has a servomotor drive 322, which drives a crankshaft 324, which is mounted with a horizontal axis, in a rotating manner via a transmission 323. Mounted rotatably on the crankshaft, on corresponding eccentric sections of the crankshaft, are a first connecting rod 326-1 and a second connecting rod 326-2. The first connecting rod is coupled to a first slide 327-1, which can be moved linearly upward and downward in the vertical first direction by the crankshaft via the connecting rod. On the end face, facing the workpiece, of the first slide 327-1 there is a receptacle for the first notching tool 325-1, which accordingly penetrates into the workpiece from above. The second connecting rod 326-2 drives an L-shaped second slide 327-2, which can also be moved upward and downward parallel to the first direction and has a tool holder for the second notching tool 325-2 at its front end. In this way, both notching tools can be fed simultaneously in opposite directions toward the workpiece or away from the workpiece by the servo drive 322. In this context, the stroke of the connecting rods or of the slides is set such that the notching tools produce notches in the workpiece without completely severing the workpiece at the separating position. On the contrary, there remain on opposite sides respective notches, between which a "web" of wire material with a tapered wire cross section remains.

The cutting device 340 functioning as a dividing device is of similar construction. It comprises a cutting drive 342 in the form of a servomotor which, via a transmission, drives a crankshaft, which is mounted with a horizontal axis and, via two connecting rods, drives a first slide 347-1, which can be moved horizontally in a linear manner, and a second slide 347-2, which can be moved linearly parallel thereto, synchronously with opposite feed directions. The slides each carry at their ends tool receptacles, in which a first cutting tool 345-1 with a wedge-shaped cutter is attached and, opposite to the second slide, a second cutting tool 345-2 with a wedge-shaped cutter is attached. By controlling the drive 342, the two wedge-shaped cutters can be moved relative to one another, toward one another or away from one another, symmetrically with respect to the passage axis 155, parallel to a second direction (y direction), to carry out a cutting operation. With the aid of the cutting tools with wedge-shaped cutters, the notched wire material can be separated by bite cutting at the separating position in the region of the tapered wire cross section, the wedge-shaped cutters being moved relative to one another, toward one another, during the cutting operation until the wire material is severed at the separating position.

The effective notching tool cutters that face the workpiece (wire) and the cutting edges of the wedge-shaped cutters of the cutting tools are arranged in the same plane (separating plane, drawing plane in FIG. 4) oriented perpendicularly to the direction of passage. Using their associated drives 322, 342, the working movements of the notching tools and of the cutting tools are coordinated by the controller 110 of the wire processing machine such that the notching tools can engage in the workpiece only when the cutting tools have moved back out into their retracted position, thus preventing a collision between the notching tools and the cutting tools. For the cutting operation, the notching tools are then moved away from the workpiece into their retracted position before the cutting tools sever the wire material of the workpiece in the region of the tapered wire cross section by bite cutting.

Figure 6:
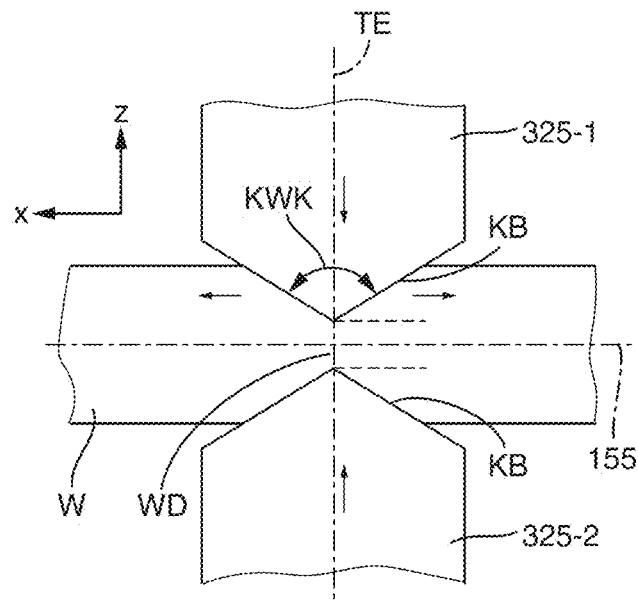
FIG. 6 shows schematically a notching operation.
Figure 7:
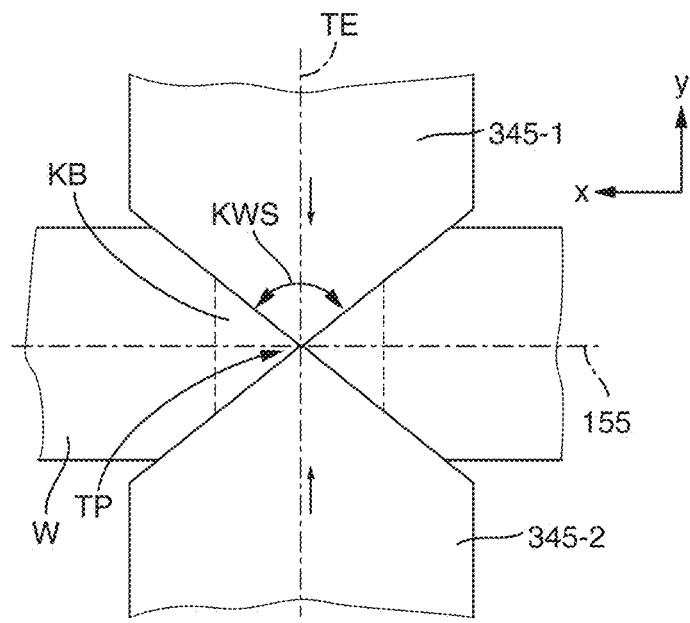
FIG. 7 shows schematically a cutting operation following the notching operation of FIG. 6.

FIGS. 6 and 7 schematically show the notching operation (FIG. 6) and the cutting operation (FIG. 7). In the notching operation (FIG. 6), notching tools 325-1, 325-2 in the form of roof-shaped notching wedges with a sharp or slightly rounded tip region are used. The wedge angle KWK between the wedge surfaces is an obtuse angle and, in the example, is somewhat more than 100°, for example, 120°. The notching operation is a pure forming operation without any material removal. When the notching tools penetrate into the wire material in an antiparallel movement, material is displaced substantially in the longitudinal direction of the wire without material removal taking place. However, this material displacement in the axial direction does not lead to bending of the wire material since the separating device 300 is mounted in a floating manner and can perform axial compensating movements. In the region between the notches there remains a tapered wire section WD in which, as a result of the notching operation, the wire material is hardened relative to undeformed wire material.

After the notching tools have been retracted, the cutting tools 345-1, 345-2 are fed synchronously in the direction of the already notched material, that is to say at the opposite notches KB, parallel to the second direction, that is to say orthogonally to the direction of action of the notching tools. FIG. 7 shows a situation in which the mutually facing cutting tool cutting edges, which lie in one plane, touch or almost touch one another such that the wire material is severed by bite cutting at the separating position TP lying in the separating plane. It is obvious that bite cutting in the region of the already notched material takes place at the separating position where the wire material is already greatly hardened by the preceding notching operation. This leads to a very smooth and well-defined fracture surface during the cutting operation.

In addition, the wedge surfaces of the notching tools and the wedge surfaces of the cutting tools ensure that clearly defined bevels in the form of oblique, more or less trapezoidal plane surfaces are formed on the wire ends of the resulting shaped parts. In some examples, the wedge angle KWS between the wedge surfaces of the cutting tools corresponds to the wedge angle KWK of the notching tools, with the result that the oblique surfaces are set at the same angle with respect to the original orientation of the side faces both on the broad sides of the flat material (these are formed by the notching tools in the example) and also on the bevels or plane surfaces on the narrow sides of the flat material (these are formed by the cutting tools in the example). It is also possible for the wedge angles of the cutting tools and of the notching tools to differ.

As a departure from the design shown, the relative arrangement of the notching device and the cutting device can also be reversed so that, for example, FIG. 4 shows the components of a cutting device (for vertical cutting) and FIG. 5 shows the components of a notching device (for horizontal notching).

Figure 9:
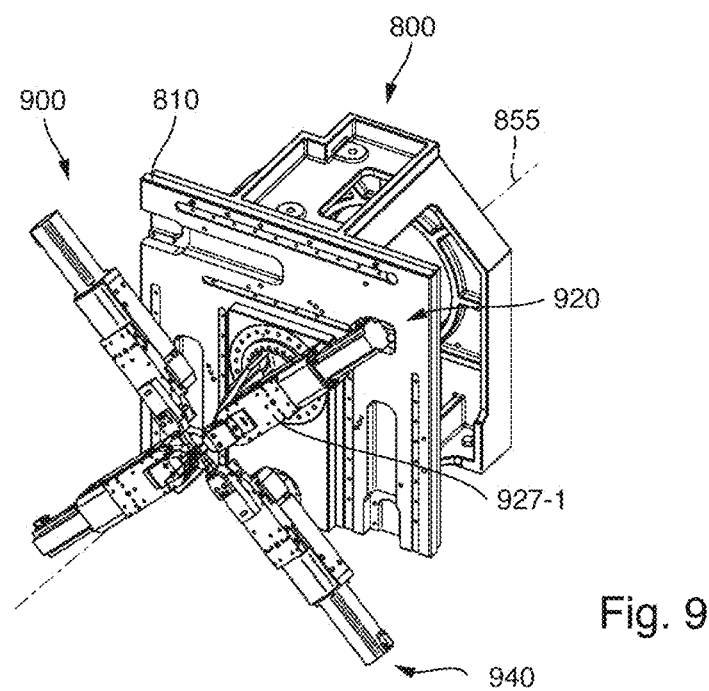
FIG. 9 shows the bending machine from FIG. 8 in an isometric view.
Figure 10:
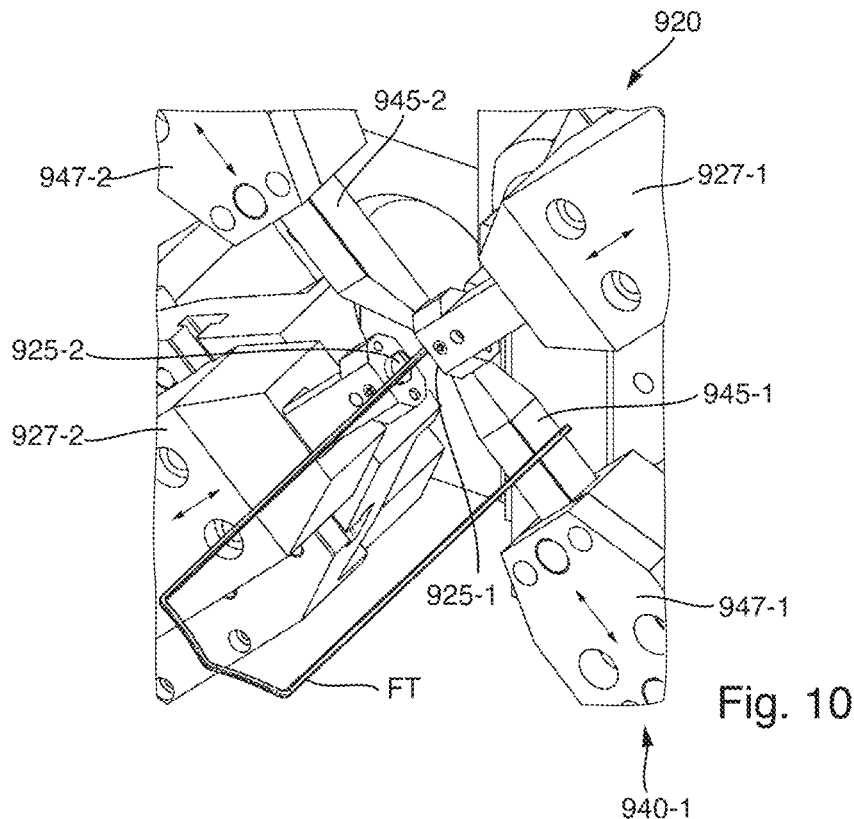
FIG. 10 shows an enlarged detail of the view in FIG. 9.

A further example of a wire processing machine with a two-stage separating device (notching and bite cutting) will be explained with reference to FIGS. 8 to 10. The wire processing machine 800 is a bending machine 800 that produces prepared bent parts, that is to say prepared shaped parts that have one or more bends between the wire ends. In the example, the bending machine 800 is constructed and programmed such that bent parts FT prepared therewith can be bent in the form of U-shaped bent coil elements, so-called hairpins, for the construction of electric motors (cf. FIG. 10).

The bending machine has a machine frame with a vertical front wall 810, in which a wire guide 820 is installed, which guides the fed wire along a passage axis 855. In the encapsulated region behind the machine front wall 810, there is, inter alia, a straightening unit and a draw-in device, by which the wire is drawn off from continuous stock and pushed forward in a directed manner through a wire guide 820. The wire guide and the upstream devices (draw-in device and straightening unit) coupled thereto for conjoint rotation therewith are rotatable in a controlled manner about the passage axis 855. Components of a separating device 900 are arranged in a vertical plane behind the wire guide. On the outlet side of the separating device facing away from the machine wall, there is the bending unit 850, not shown in detail here, with one or more bending tools for producing the intended bends in the wire material. During the production process, the wire material is conveyed forward in the direction of the bending unit 850 and is bent there once or several times in one or more bending planes which are offset with respect to one another to obtain the desired bending geometry of the shaped part. The finished shaped part is then separated from the fed wire stock with the aid of the separating device 900.

The separating device 900 as a whole is mounted in a floating manner parallel to the x direction of the machine coordinate system or parallel to the passage axis 855 to allow compensating movements of the longitudinal extent on the produced shaped part during the notching and cutting operations if required. It is also possible to connect up a servomotor which (similarly to the servomotor 314 of FIG. 2) can be used to actively move the separating device 900 parallel to the passage axis 855 during the separating process if the floating mounting is not sufficient to enable the resulting forces in the longitudinal direction to be compensated.

The separating device 900 comprises a notching device 920 and a cutting device 940, which together form a cruciform arrangement with four subunits. The notching device 920 comprises a linearly movably mounted first slide 927-1 that can be moved back and forth in a first direction radially to the passage axis 855 of the material with the aid of a flanged-on servo drive via an interposed transmission with a ball screw. At the end of the slide which faces the tool, there is a tool receptacle for accommodating a first notching tool 925-1. A second slide 927-2 is mounted diametrically opposite and, via its own servo drive, can feed a second notching tool 925-2 in an anti-parallel movement to the first notching tool in the direction of the workpiece or in the opposite direction (parallel to the first direction). The first direction is at an angle of 45° to the y and z directions in a y-z plane perpendicular to the passage axis.

The two subunits of the cutting device 940 are arranged at a circumferential offset of 90° with respect to the corresponding units of the notching device. In this example, a first slide 947-1 of the cutting device carries a first cutting tool 945-1 with a wedge-shaped cutter and, opposite to this, a second slide 947-2 carries the second cutting tool 945-2 with a wedge-shaped cutter. The arrangement of the tools can be seen particularly well in FIG. 10.

The slides are each mounted on plate-shaped supports which can be moved both parallel to the z direction and parallel to the y direction, thus enabling the tools carried by the slides and the working direction of the tools to be matched to the respective workpiece geometry.

In this example, there is a dedicated servo drive for each of the tools (each of the two notching tools and each of the two cutting tools). The servo drives are coordinated via the control unit of the wire processing machine such that, in the same plane (separating plane), where the separating position of the wire is located, the notching tools are first of all fed in an anti-parallel movement to produce the opposing notches, after which the notching tools are retracted radially, and then, in the second direction, which is perpendicular to the first direction, the cutting tools with the wedge-shaped cutters are fed in radially inward until the wire material is severed by bite cutting in the region of the tapered wire web.

Figure 8:
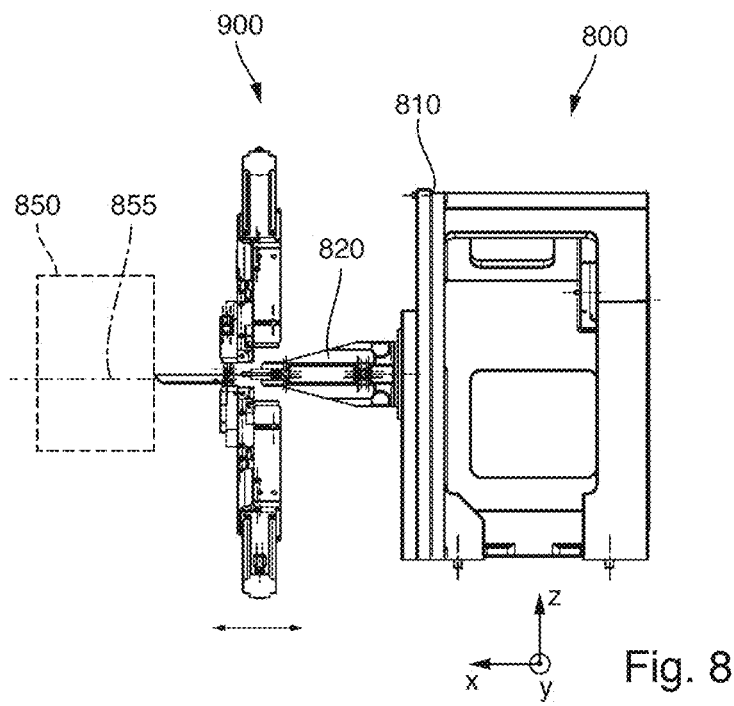
FIG. 8 shows a side view of another example of a wire processing machine in the form of a bending machine with a two-stage separating device.

As a departure from the illustration in FIG. 8, there are also examples in which the components of the separating device and the components of the bending unit which are used to produce bends lie in a common plane. The slides and tools of the bending unit can, for example, each lie circumferentially between the units of the notching device 920, which are inclined at 450 to the horizontal, and the cutting device 940 in FIG. 9. They can form a cruciform arrangement with horizontally and vertically aligned units.

As a departure from the illustration in FIG. 8, there are also examples in which the components of the separating device and the components of the bending unit which are used to produce bends lie in a common plane. The slides and tools of the bending unit can, for example, each lie circumferentially between the units of the notching device 920, which are inclined at 45° to the horizontal, and the cutting device 940 in FIG. 9. They can form a cruciform arrangement with horizontally and vertically aligned units.

We found in many experiments that the two-stage separating operation with prior notching by forming and subsequent severing in the tapered wire section by bite cutting leads to geometrically very well-defined wire ends in the production of prepared shaped parts. For illustration, comparative experiments were carried out in which, on the one hand, severing was carried out by our two-stage method and, on the other hand, for comparison, by a single bite cutting operation without prior notching.

Figure 11B:
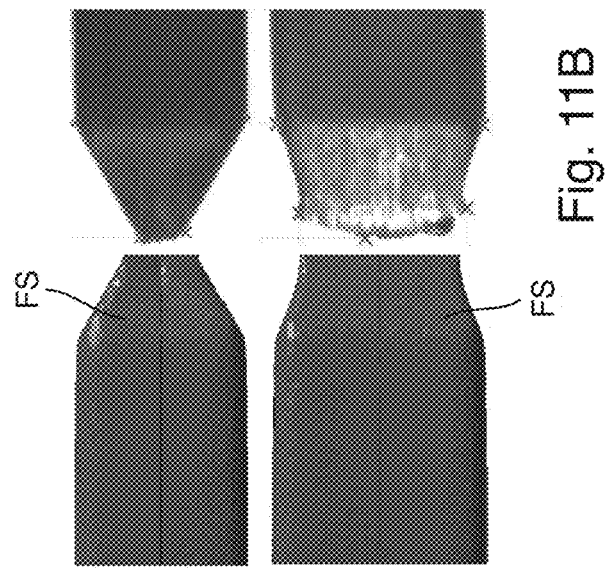
FIG. 11B shows, analogously to FIG. 11A, views of a produced wire end of a flat wire after two-stage separation (notching and subsequent bite cutting) according to one example.
Figure 11A:
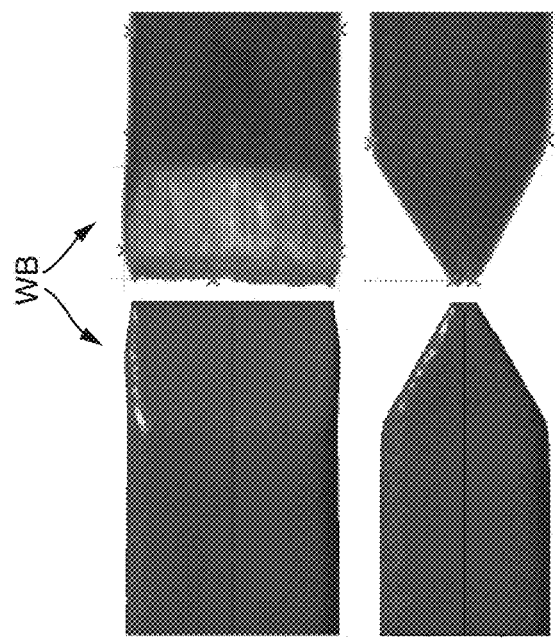
FIG. 11A shows views of a produced wire end of a flat wire from the broad side (upper partial figures) and from the narrow side (lower partial figures) after single-stage separation by bite cutting (FEM simulation on the left, a photographic image on the right in a mirror image).

For explanation, FIG. 11A shows views of a wire end of a flat wire with a rectangular cross section from the broad side on the one hand (upper partial figures) and from the narrow side on the other hand (lower partial figures). In each instance, the result of a finite element (FEM) simulation is shown on the left and the photographic image of a wire end according to the experiment is shown on the right in a mirror image. Numerous experiments were carried out. Due to the good agreement between the simulation and the experiment, it is assumed that the results are representative and significant.

In the bite cutting operation without prior notching (FIG. 11A), the production of notches on opposite broad sides of the material results in a marked widening of the cross section in the form of an outwardly directed curvature WB of the material on the narrow sides. In this region, material is displaced outward beyond the envelope contour of the original, unprocessed wire material by material displacement. Apart from this, the generated geometry corresponds to the desired geometry with substantially flat inclined bevels on the broad sides of the wire ends.

In comparison, FIG. 11B shows the results when carrying out a cutting operation with a prior notching operation. As can be seen from the lower two partial figures, the narrow sides of the wire material also have a clear cross-sectional taper in the form of a slightly inwardly curved but otherwise more or less flat bevel FS. The wire end produced in that way is thus provided with inwardly directed bevels FS both on the broad sides and on the narrow sides, with the result that no material projects beyond the envelope contour of the starting material in the end region.

The drive concept of the examples shown above is only illustrative. There are also other possibilities to actuate the notching tools and the cutting tools.

Figure 12:
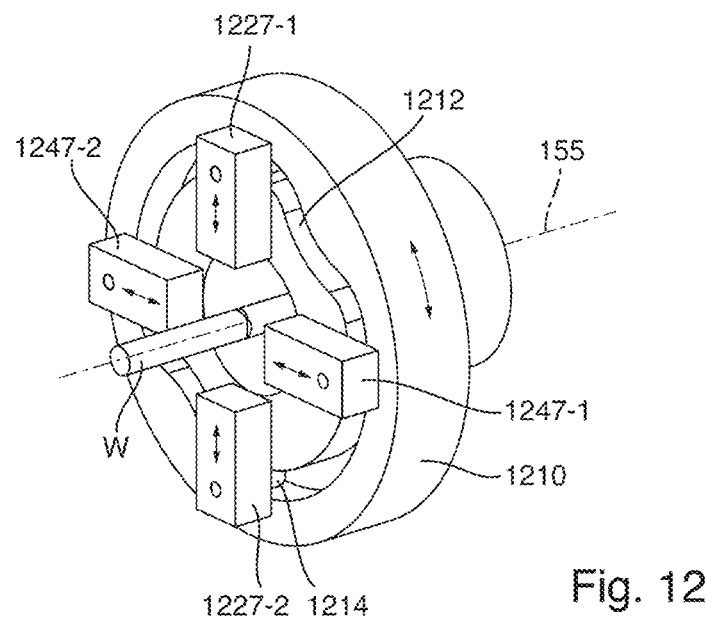
FIG. 12 schematically shows an alternative drive concept with a cam disk.

FIG. 12, which is schematic, shows, by way of example, components of a drive concept which manages with a single drive for the notching tools and the cutting tools. The drive (not illustrated) drives a cam disk 1210 that can be rotated with the aid of the drive about an axis of rotation running parallel to or coaxially with the passage axis 155. The cam disk is equipped with a cam track, which, in the example, is introduced in the form of a circumferential groove 1212 or can also be located on the outside or inside of the cam disk. The profile of the cam track is sensed by rollers 1214, which, in the example, are attached to vertically movable first slides 1227-1, 1227-2 and horizontally movable second slides 1047-1, 1047-2. Similarly to the first example, the slides, which are guided to be linearly movable radially with respect to the passage axis 155, carry on their inside, which faces the workpiece, the tool receptacles for the notching tools or cutting tools.

Depending on the design, the slide movement can be reset either positively by the geometry of the groove 1212 or a restoring force of a spring which presses the roller or the element coupled to the roller against the cam track. In this concept, both the vertical notching movement and the horizontal cutting movement are controlled using a single cam disk 1210. The cam desk can be replaced to achieve different kinematics. Very high forces can be generated by a cam geometry, which is advantageous for the forming processes, especially during notching, but also during bite cutting. In the example, the cam disk does not rotate without restriction but is moved in a reversing manner in a range of a maximum of 90° (see double arrow). The notching depth is set via the angle of rotation of the cam disk. The further the maximum pivoting range of 90° is utilized, the deeper the notches are each impressed. The concept of the cam disk is a compact solution in which two movements (for notching tools and cutting tools) can be achieved in a small space. Good and variable force transmission is obtained when a cam with different gradients is used.

Examples are also possible in which only two servo drives with wedge-shaped tools are provided, these being used both for notching and cutting. For this purpose, the wire can be rotated through 90° between notching and cutting, for example.

It is also possible to design or configure the wedge-shaped tools such that, by appropriate movement in the z and y directions a notching operation, on the one hand, and (in the same plane) a cutting operation in a direction perpendicular thereto, on the other hand, is possible on the wire W. In this regard, FIG. 13A shows a notching operation with two tools 1330-1, 1330-2, each of which is triangular at the free end and each of which has two cutters, each of which is wedge-shaped and extends at 90° relative to the other. The notches are made on two flat sides, situated opposite one another in the y direction, of the wire, which is rectangular in cross section. FIG. 13B shows a cutting operation with the same tools that are triangular at the free end, the wedge-shaped cutters, which are offset by 90°, now being used. The feed direction for the cutting operation is parallel to the z direction. The tools thus function both as notching tools and as cutting tools. For each of the operations, they have a wedge-shaped cutter, the cutting edges of these cutters being perpendicular to one another.

The separating device of this example has a notching device and a cutting device, which can be actuated later than the notching device, the devices sharing the same components, with the result that the notching device is also used as a cutting device. Thus, the notching device and the cutting device do not have to be two mutually separate devices. They can be integrated.

The tools 1330-1, 1330-2 in FIG. 13 are examples of combination tools which have an integrated notching tool and an integrated bite cutting tool with straight cutting edges running orthogonally to one another. In FIG. 13A, the notching tools are in synchronous engagement with the workpiece and, in FIG. 13B, the cutting tools are in synchronous engagement with the symmetrically wedge-shaped cutters.

Another process example, in which other combination tools 1430-1, 1430-2 are used, will be described with reference to FIGS. 14A to 14D. A first notching tool 1425-1 and a second notching tool 1425-2 with mutually orthogonal wedges and a cutting tool 1435-1 designed as a shearing blade are integrated into this.

Figure 14B:
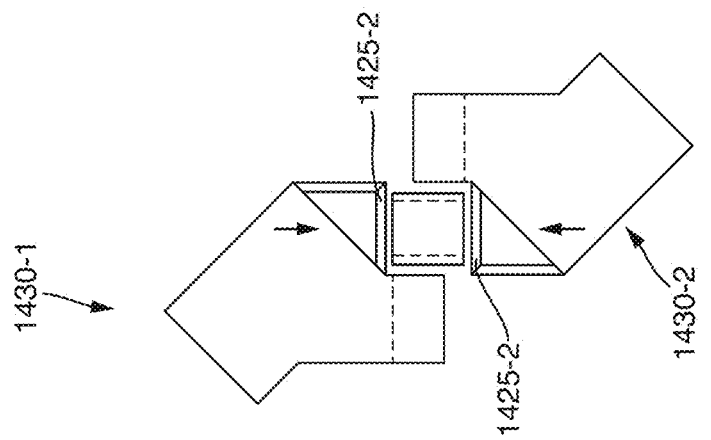
Figure 14A:
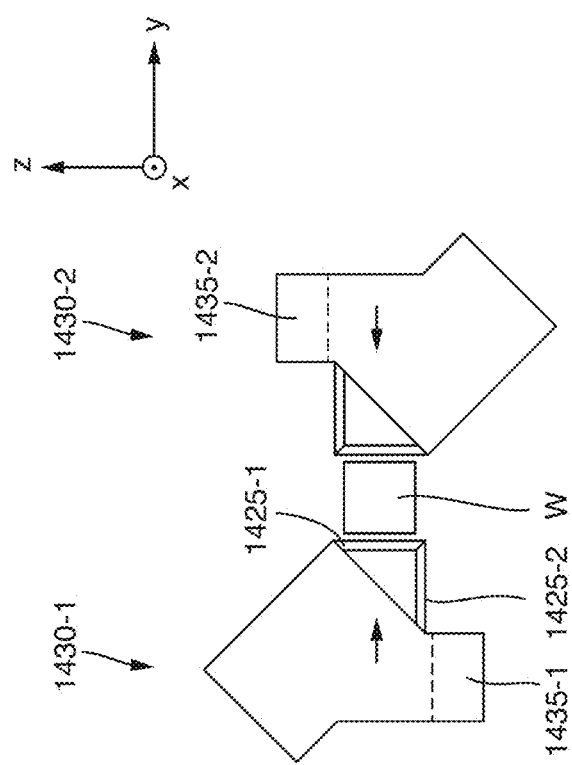

In the process, a workpiece W in the form of a wire with a rectangular cross section is divided up or separated at a separating position. For this purpose, the wire W is first of all notched simultaneously on the flat side faces situated opposite one another in the y direction (FIG. 14A). Then, at the same axial position, the wire is notched with the same combination tools 1430-1, 1430-2 on those flat side faces which lie opposite one another in the z direction (FIG. 14B). The workpiece is therefore notched on all four side faces in a two-stage notching operation (or with the aid of two notching operations), with the result that there are V-shaped notches there. The notch bottoms KG illustrated in dashed lines in FIG. 14C delimit the tapered wire cross section at the separating position.

After being notched on all sides, the wire is completely severed at the separating position in a shear cutting operation, that is to say by shear cutting. For this purpose, a respective cutting tool 1435-1, 1435-2 designed for a shear cut is integrated on the combination tools 1430-1, 1430-2, wherein one of the cutting tools, for example, cutting tool 1435-1, functions as an upper cutter and the other cutting tool, for example, cutting tool 1435-2, functions as a lower cutter of the cutting device. The cutting tools 1435-1, 1435-2 may also be referred to as shearing tools or shearing blades.

In the side view of FIG. 14D, the shape of the cutting tools (shear cutting tools) can be clearly seen. Each of the cutting tools 1435-1, 1435-2 has a cutting edge 1436-1, 1436-2 which runs in a straight line parallel to the y direction when the tool is fastened to the tool holder of the associated machine axis and is correctly set up. The cutting edge is formed on an asymmetrical cutting wedge, whose boundary surface (flank) 1437-1, 1437-2, which is close to the separating position, is aligned almost parallel to the z-y plane, while the other boundary surface (pressure surface) 1438-1, 1438-2 encloses with the latter, at the cutting edge 1436-1, 1436-2, a wedge angle KW of less than 90° and thus runs obliquely to the y and z directions. The wedge angle KW is approximately half as large as the wedge angle KWK of the notching tools which have carried out the preceding notching steps.

To carry out the shear cutting operation, the wire W is at rest, that is to say it is not advanced. The combination tools are moved with the aid of the associated machine axes such that the cutting edges 1436-1, 1436-2 are substantially in the separating position or the separating plane of the stationary wire.

For this purpose, starting from the preceding last notching operation, axial movements parallel to the z axis and oppositely directed movements of the two cutting tools parallel to the x direction are required. Between the flanks of the cutting wedge which are associated with the separating position TP there is usually a narrow cutting gap, the size of which can be in the range of one or a few hundredths of a millimeter, for example.

Starting from the relative position shown in FIG. 14D, the shear cutting tools are then fed synchronously in opposite directions (arrows) parallel to the z direction. During this process, the cutting edges 1436-1, 1436-2 initially come into contact more or less simultaneously (in the ideal instance simultaneously) with the bottom of the facing notches and then push further into the interior of the wire material. Upon further penetration of the cutting wedges, the wedge surfaces 1436-1, 1436-2 act as pressure surfaces which force the material outward from the separating position in the opposite direction. In a cutting phase, the cutting edges 1436-1, 1436-2 approach each other symmetrically with respect to the longitudinal axis of the wire (wire center) MA to an ever-increasing extent until the intervening wire cross section is very thin and the material tears in a tearing phase when the maximum shear stress is exceeded. The feed in opposite directions can be stopped if the wire has been severed before the cutting edges reach one another. This may be, for example, with relatively hard or brittle materials such as spring steel. It is also possible for the cutting edges to run past one another in the final phase of the shear cutting operation. This will regularly be during the shear cutting of copper or other comparatively soft metals.

With the aid of the shear cutting operation, it is possible, with correct setting of the process parameters, to produce end faces at the separated wire ends which are aligned macroscopically flat and perpendicular with respect to the longitudinal axis of the wire. The end section of the wire then has the shape of a rectangular truncated pyramid with a flat end face and is particularly suitable for making large-area contact, for example, by a welding process.

The complete non-cutting separating operation of the example in FIG. 14 thus consists of three steps, which can be described as follows:

First step: two wedge blades arranged at right angles at a distance from the wire move symmetrically in the direction of the wire center. This movement is stopped after a defined feed of the tools and thus "only" displacement of material occurs and no cutting/separating operation is carried out. After this step, the material is notched on two sides.

Second step: two further wedge blades arranged at right angles at a distance from the wire, but arranged orthogonally to the other two wedge blades, likewise move symmetrically in the direction of the wire center. This movement is likewise stopped after a defined feed of the tools and thus "only" displacement of material occurs and no cutting/separating operation is carried out. After this step, the material is notched on four sides.

Third step: two shearing blades arranged at right angles at a distance from the wire move symmetrically in the direction of the wire center. The cutting edges of the two blades move in the direction of the wire center until the wire is sheared off.

The three steps for four-sided notching and the subsequent separation by shearing should take place in one plane. In the rectangular material, the wire end has the shape of a truncated pyramid after cutting.

Processes of the type described here can be used, for example, for the geometric shaping of wire ends in copper components such as hairpins, busbars, contact pins and the like. Notching and cutting of chain links is thus also possible.

The invention claimed is:

1. A method of producing prepared shaped parts from wire comprising:
    drawing wire in from a wire stock and feeding the wire to a wire processing machine;
    straightening the wire in the wire processing machine; and
    separating shaped parts of a predefinable wire length from the straightened wire,
    wherein, to separate a shaped part from the fed wire, at a separating position provided for separation, the wire is first notched in at least one notching operation from two opposite sides by notching tools such that a tapered wire cross section remains between opposing notches at the separating position, and
    in a dividing operation, the notched wire is separated at the separating position in a region of the tapered wire cross section by engagement of two dividing tools on opposite sides of the wire and their synchronous feed in opposite feed directions perpendicularly to the wire axis until the wire material is severed at the separating position;
    wherein prior to performing the dividing operation, the notching tools are moved away from the workpiece into a retracted position after the notching operation before the cutting tools sever the wire material of the workpiece.

2. The method as claimed in claim 1, wherein the notching operation is carried out as a forming operation in which the notches are produced exclusively by material forming, without material removal.

3. The method as claimed in claim 1, wherein a feed movement of the notching tools is controlled such that the notching tools are fed synchronously in opposite feed directions perpendicularly to the wire axis and/or that a penetration depth of the notching tools is at least 10% of an extent of the unnotched wire in a first direction and/or that residual widths which are in the range of 90% or less of the original diameter in the first direction remain in the tapered wire section perpendicularly to the longitudinal direction of the wire.

4. The method as claimed in claim 1, wherein the wire is separated at the separating position by a cutting operation by bite cutting or shear cutting, after completion of the notching operation.

5. The method as claimed in claim 4, wherein, during the cutting operation, the wire is separated at the separating position by bite cutting, the wire being held between two separating tools designed as cutting tools, with wedge-shaped cutters, and the wedge-shaped cutters are moved relative to one another, toward one another, until the wire material is severed at the separating position, and cutting edges formed on the wedge-shaped cutters lie in a common plane.

6. The method as claimed in claim 5, wherein the notching tools are located opposite one another in a first direction and fed in parallel to the first direction, the cutting tools with the wedge-shaped cutters are located opposite one another in a second direction and fed in parallel to the second direction, and the first and the second direction run perpendicular to one another.

7. The method as claimed in claim 1, wherein the dividing operation is a shearing operation, the wire is separated at the separating position by shear, the wire being held between two dividing tools designed as shearing tools, engage on different axial sides of the separating position and are moved synchronously in opposite feed directions perpendicularly to the wire axis until the wire material is severed at the separating position.

8. The method as claimed in claim 7, wherein the shearing operation is a shear cutting operation in which the wire is separated at the separating position by shear cutting, the wire being held between a shear cutting tool designed as an upper blade and a shear cutting tool designed as a lower blade, and cutters of the shear cutting tools being moved toward one another in opposite directions in axially offset planes, and also being moved past one another until the wire material is severed at the separating position.

9. The method as claimed in claim 7, wherein, in the notching operation preceding the shearing operation, the wire is first notched on two sides located opposite one another in a first direction and then on two sides located opposite one another in a second direction, wherein the first and the second direction run perpendicular to one another.

10. The method as claimed in claim 1, wherein the wire is not moved in the longitudinal direction of the wire between the notching operation and the dividing operation, with the result that the notching operation and the dividing operation are carried out in the same plane.

11. The method as claimed in claim 1, where a respective combination tool is used for the notching operation and the dividing operation on opposite sides of the wire, said combination tool having at least one integrated notching tool and one integrated dividing tool, and the combination tools are fed synchronously in pairs, one after the other in time, in two mutually perpendicular directions.

12. The method as claimed in claim 1, wherein, before the notching operation and/or the dividing operation, a wire section to be separated is gripped by a transport gripper, and, after the dividing operation has been completed, the separated shaped part is transported by the transport gripper to a downstream workstation.

13. The method as claimed in claim 12, wherein the transport gripper is guided in a linearly movable manner parallel to a wire transport axis and is switched to a reduced force and torque during the notching operation and/or during the dividing operation, thus enabling the transport gripper to follow in a floating manner length-compensating movements of the wire section to be separated during the notching operation and/or during the dividing operation.

14. The method as claimed in claim 1, wherein the wire having a rectangular cross section is processed in the form of flat material having two broad sides parallel to one another, and two narrow sides oriented perpendicularly to the broad sides.

15. The method as claimed in claim 1, wherein, after straightening, straight wire rods of predefined length are separated from the straightened wire, or, after straightening and before separation, one or more bends are produced in the straightened wire, with the result that the shaped part is a bent part.

* * * * *